(12) United States Patent
Sugihara et al.

(10) Patent No.: US 11,505,138 B2
(45) Date of Patent: *Nov. 22, 2022

(54) WIRE HARNESS

(71) Applicant: SUMITOMO WIRING SYSTEMS, LTD., Yokkaichi (JP)

(72) Inventors: Sei Sugihara, Yokkaichi (JP); Toshiya Ota, Yokkaichi (JP)

(73) Assignee: SUMITOMO WIRING SYSTEMS, LTD., Mei (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/197,230

(22) Filed: Mar. 10, 2021

(65) Prior Publication Data

US 2021/0291760 A1 Sep. 23, 2021

(30) Foreign Application Priority Data

Mar. 23, 2020 (JP) .............................. JP2020-050501

(51) Int. Cl.
*B60R 16/02* (2006.01)
*H02G 3/04* (2006.01)

(52) U.S. Cl.
CPC ....... *B60R 16/0215* (2013.01); *H02G 3/0468* (2013.01)

(58) Field of Classification Search
CPC ............ B60R 16/0215; B60R 16/0222; B60R 16/0207; B60R 16/02; H02G 3/0468
See application file for complete search history.

(56) References Cited

U.S. PATENT DOCUMENTS

| | | | |
|---|---|---|---|
| 6,417,445 B1 * | 7/2002 | Sato | H01B 11/1808 174/36 |
| 2017/0331263 A1 * | 11/2017 | Matsumura | H01B 7/0045 |
| 2018/0265018 A1 * | 9/2018 | Yabashi | F16L 5/10 |
| 2020/0271248 A1 * | 8/2020 | Elliott | F16L 43/008 |

FOREIGN PATENT DOCUMENTS

JP 2016-027770 A 2/2016

* cited by examiner

*Primary Examiner* — Paresh Paghadal
(74) *Attorney, Agent, or Firm* — Oliff PLC

(57) ABSTRACT

A wire harness including: a wire member; a protector that houses the wire member; a first corrugated tube that externally extends from an end of the protector and covers an outer circumference of the wire member; a second corrugated tube that is provided at a location that is on an opposite side to the protector with respect to the first corrugated tube and spaced apart from the first corrugated tube, and covers the outer circumference of the wire member; and an exterior cover that covers the outer circumference of the wire member.

5 Claims, 3 Drawing Sheets

WIRE HARNESS

BACKGROUND

The present disclosure relates to a wire harness.

Conventionally, a wire harness that is routed in a vehicle is provided with a wire and a protector for housing the wire.

A wire harness disclosed in JP 2016-27770A includes a corrugated tube that extends externally from an end portion of the protector and covers an outer circumference of the wire. The corrugated tube has a bellows structure in which mountain portions and valley portions are alternately arranged side by side along a length direction of the corrugated tube. Recessed portions and ribs that respectively fit in the mountain portions and the valley portions of the corrugated tube are provided at an end portion of the protector.

SUMMARY

Incidentally, when routing the wire harness or the like, if the corrugated tube is bent, the corrugated tube may be crushed due to being pressed against an edge of the protector.

An exemplary aspect of the disclosure provides a wire harness that can suppress crushing of a corrugated tube.

A wire harness according to the present disclosure includes a wire member, a protector that houses the wire member, a first corrugated tube that externally extends from an end of the protector and covers an outer circumference of the wire member, a second corrugated tube that is provided at a location that is on an opposite side to the protector with respect to the first corrugated tube and spaced apart from the first corrugated tube, and covers the outer circumference of the wire member, and an exterior cover that covers the outer circumference of the wire member, and the wire member includes an intermediate portion that is located between the first corrugated tube and the second corrugated tube in a lengthwise direction of the wire member, and the exterior cover covers an outer circumference of the intermediate portion of the wire member and has a higher flexibility than the first corrugated tube.

According to the present disclosure, crushing of the first corrugated tube due to being pressed against the edge of the protector can be suppressed.

DETAILED DESCRIPTION OF EMBODIMENTS

Figure 1:
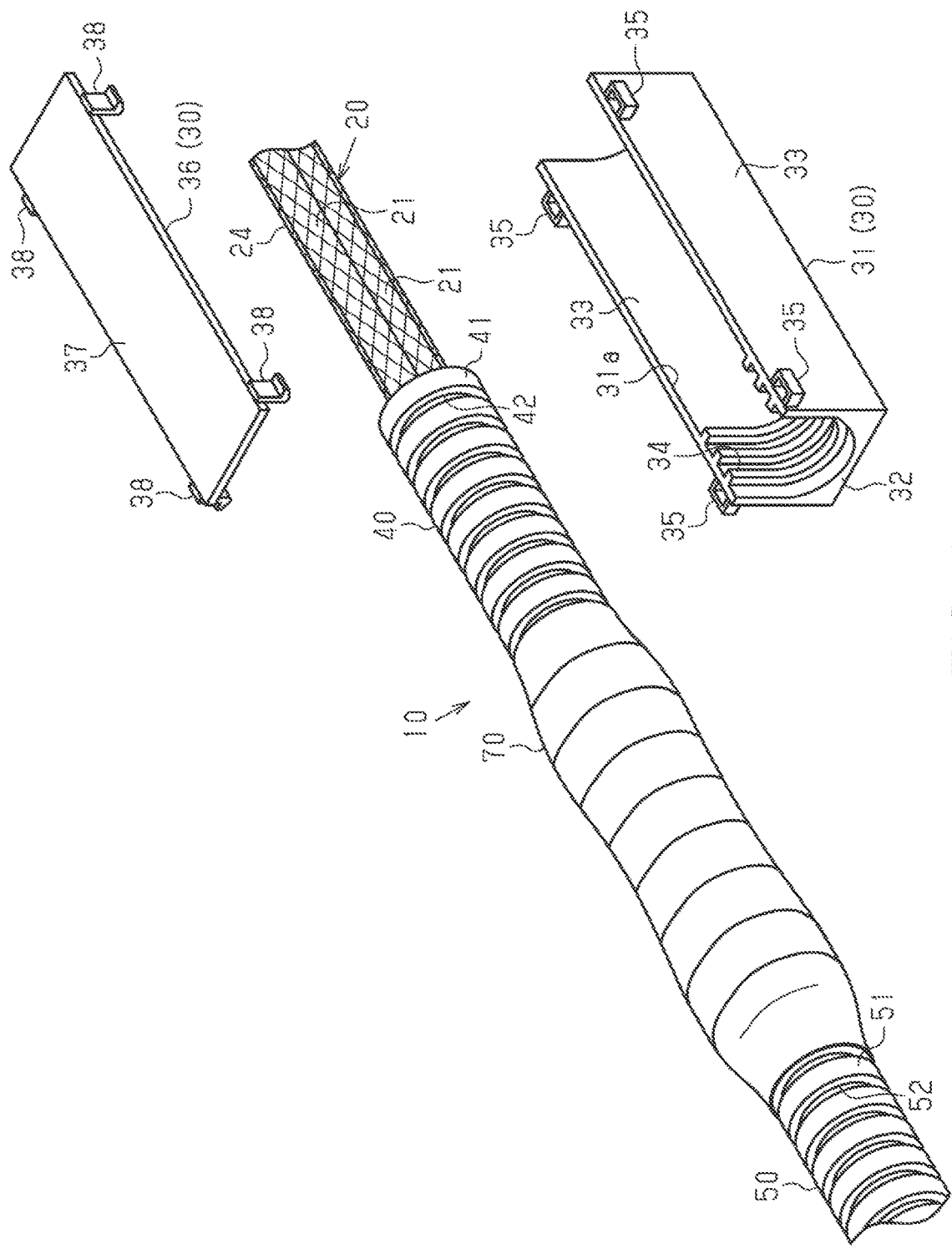
FIG. 1 is a perspective view showing a wire harness according to an embodiment.

Description of the Embodiments of the Disclosure

First, embodiments of the present disclosure will be listed and illustrated.

(1) A wire harness according to the present disclosure includes a wire member, a protector that houses the wire member, a first corrugated tube that externally extends from an end portion of the protector and covers an outer circumference of the wire member, a second corrugated tube that is provided at a location that is on an opposite side to the protector with respect to the first corrugated tube and spaced apart from the first corrugated tube, and covers the outer circumference of the wire member, an exterior member that covers the outer circumference of the wire member, and the wire member includes an intermediate portion that is located between the first corrugated tube and the second corrugated tube in a lengthwise direction of the wire member, and the exterior member covers an outer circumference of the intermediate portion of the wire member and has a higher flexibility than the first corrugated tube.

According to this configuration, since the exterior member has a higher flexibility than that of the first corrugated tube, if the wire harness is bent, the external force that acts on the second corrugated tube is not likely to be transmitted to the first corrugated tube. In this manner, when the wire harness is bent, the exterior member is likely to bend and the first corrugated tube is not likely to bend. Accordingly, crushing of the first corrugated tube due to being pressed against the edge of the protector can be suppressed.

(2) A configuration is preferable in which the wire harness includes a fixing member that fixes the exterior member to the first corrugated tube and the second corrugated tube.

According to this configuration, positional displacement of the exterior member with respect to the first corrugated tube and the second corrugated tube is suppressed by the fixing member.

(3) A configuration is preferable in which the exterior member overlaps the first corrugated tube and the second corrugated tube in a direction intersecting the lengthwise direction of the wire member, and the fixing member is provided on the outer circumferences of the first corrugated tube and the exterior member and on the outer circumferences of the second corrugated tube and the exterior member.

According to this configuration, since the fixing member is not in contact with the outer circumferential surface of the wire member, relative movement of the wire member with respect to the first corrugated tube, the second corrugated tube, and the exterior member is permitted. Accordingly, the assembling workability of the wire harness can be improved.

(4) A configuration is preferable in which the exterior member is formed by rolling a resin sheet material into a tubular shape.

According to this configuration, the exterior member can be easily attached afterwards. Accordingly, the assembling workability of the wire harness can be improved.

(5) A configuration is preferable in which the wire member includes a wire, and a braided wire that is formed by braiding conductive strands into a tubular shape and covers the outer circumference of the wire.

According to this configuration, the braided wire electromagnetically shields the wire.

DETAILED DESCRIPTION OF THE EMBODIMENTS OF THE DISCLOSURE

Hereinafter, specific examples of the wire harness according to the present disclosure will be described with reference to the drawings. In the drawings, a portion of the configuration may be exaggerated or simplified for illustrative reasons. In addition, the ratios between the dimensions of the parts may differ from drawing to drawing. Note that the present disclosure is not limited to these illustrative examples and is defined by the claims, and all changes which come within the meaning and range of equivalency of the claims are intended to be embraced therein. "Orthogonal" in this specification encompasses being generally orthogonal in a range that achieves the operations and effects of the present embodiment, in addition to being strictly orthogonal.

Configuration of Wire Harness 10

The wire harness 10 of the present embodiment electrically connects, for example, electrical devices installed in a vehicle such as a hybrid car, an electric car, and the like, to each other.

Figure 2:
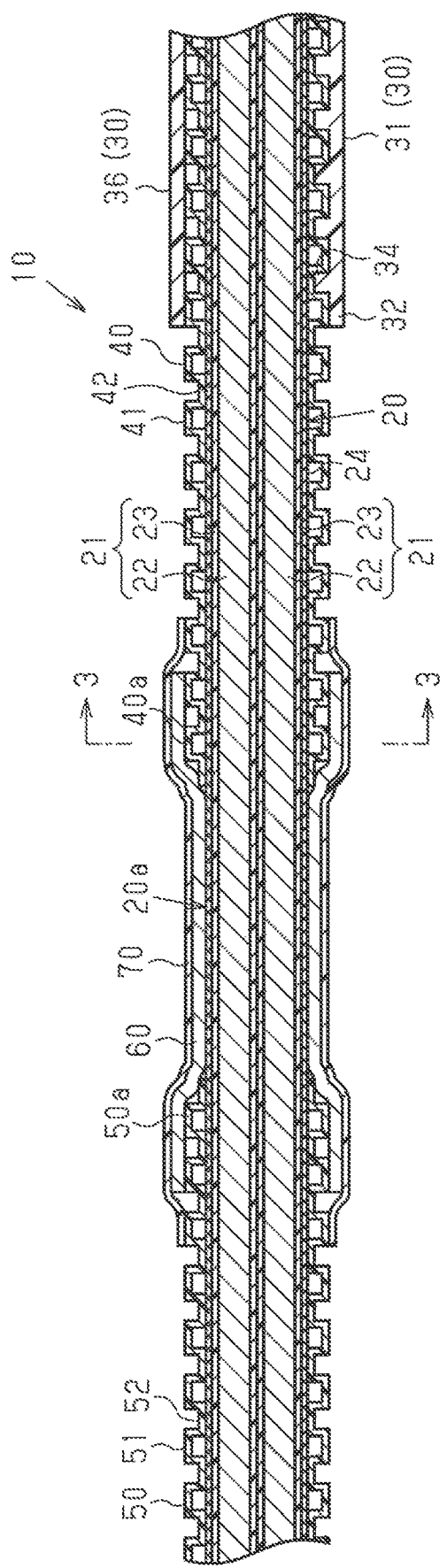
FIG. 2 is a cross-sectional view showing a wire harness according to an embodiment.

As shown in FIG. 1 and FIG. 2, the wire harness 10 includes a wire member 20 and a tubular protector 30 that houses the wire member 20. The protector 30 houses a portion in a lengthwise direction of the wire member 20.

A pair of connectors (not shown) that are to be connected to the above-described electrical devices are attached to the two end portions in the lengthwise direction of the wire member 20.

As shown in FIG. 2, the wire harness 10 includes a first corrugated tube 40 that covers a portion of the outer circumference in the lengthwise direction of the wire member 20, and a second corrugated tube 50 that covers another portion of the outer circumference in the lengthwise direction of the wire member 20.

A portion of the first corrugated tube 40 is housed in the protector 30. In other words, the first corrugated tube 40 extends externally from an end portion of the protector 30. The second corrugated tube 50 is provided at a location on the opposite side to the protector 30 with respect to the first corrugated tube 40, and that is spaced apart from the first corrugated tube 40.

The wire member 20 includes an intermediate portion 20a located between the first corrugated tube 40 and the second corrugated tube 50 in the lengthwise direction of the wire member 20.

The wire harness 10 includes an exterior member 60 (exterior cover) that covers an outer circumference of the intermediate portion 20a. The exterior member 60 is provided so as to span between the outer circumference of an end portion 40a on the second corrugated tube 50 side of the first corrugated tube 40 and the outer circumference of an end portion 50a on the first corrugated tube 40 side of the second corrugated tube 50. In other words, the exterior member 60 overlaps the end portion 40a of the first corrugated tube 40 and the end portion 50a of the second corrugated tube 50 in a direction intersecting the lengthwise direction of the wire member 20.

The exterior member 60 is fixed to the first corrugated tube 40 and the second corrugated tube 50 with a tape member 70. The tape member 70 is an example of the fixing member.

Configuration of Wire Member 20

The wire member 20 includes two wires 21 and a braided wire 24 that collectively covers the outer circumferences of the wires 21. The wires 21 are coated wires that each include a core wire 22 formed of a conductor and an insulating coating 23 that covers an outer circumference of the core wire 22.

Configuration of Wire 21

Examples of material that can be used for the core wire 22 include a twisted wire formed by twisting a plurality of metal strands together, a columnar conductor formed by one columnar metal rod having a solid interior structure, and a tubular conductor having a hollow interior structure. Furthermore, a combination of multiple kinds of conductors such as a twisted wire, a columnar conductor, a tubular conductor, and the like can also be used for the core wire 22. Examples of the columnar conductor include a single-core wire and a bus bar. The core wire 22 of the present embodiment is a twisted wire. A metal material such as a copper-based material or an aluminum-based material can be used as the material 22 of the core wire 22.

The cross-section of the core wire 22 taken along a plane orthogonal to the lengthwise direction of the core wire 22, that is, the lengthwise direction of the wires 21 can be any shape. The cross-section of the core wire 22 is shaped like a circle, a semicircle, a polygon, a square, an oblate shape, or the like, for example. The cross-section of the core wire 22 of the present embodiment is shaped like a circle.

The insulating coating 23 covers the entirety of the outer circumferential surface of the core wire 22 in the circumferential direction thereof. In the present embodiment, the insulating coating 23 is shaped like a cylinder extending in the lengthwise direction of the wires 21. The insulating coating 23 is formed of an insulating material such as a synthetic resin, for example. A synthetic resin that contains a polyolefin-based resin such as cross-linked polyethylene and cross-linked polypropylene as a main component, for example, can be used as the material of the insulating coating 23. Furthermore, a single material or two or more materials combined as appropriate may be used as the material of the insulating coating 23.

Configuration of Braided Wire 24

The braided wire 24 is formed by conductive strands being braided in a tubular shape. The strands of the present embodiment are metal strands. Examples of the material of metal strands that can be used include a metal material such as a copper-based material and an aluminum-based material. The braided wire 24 is flexible.

The braided wire 24 covers the wires 21 from one end to the other end in the lengthwise direction of the wires 21. The braided wire 24 also covers the entirety in the circumferential direction of the outer circumferential surface of the wires 21. Accordingly, the braided wire 24 is provided between the wires 21 and the exterior member 60. The braided wire 24 is in contact with the outer circumferential surface of the wires 21. The two end portions of the braided wire 24 in the lengthwise direction of the wires 21 are electrically connected to the conductive members of the above-described pair of connectors.

Configuration of Protector 30

As shown in FIG. 1, the protector 30 includes a protector main body 31 and a cover 36 that is attached to the protector main body 31. In the protector 30 of the present embodiment, the protector main body 31 and the cover 36 are formed as separate components. The cover 36 is formed so as to be attachable to and detachable from the protector main body 31. The protector main body 31 and the cover 36 are formed of an insulating material such as a synthetic resin. A synthetic resin such as polyolefin, polyamide, polyester, or ABS resin can be used as the material of the protector main body 31 and the cover 36. The material of the protector main body 31 and the material of the cover 36 may be the same as or different from each other.

The protector main body 31 includes an elongated bottom wall 32 that is elongated in the lengthwise direction of the wire member 20, and a pair of side walls 33 that protrude from the two sides in the width direction of the bottom wall 32 and oppose each other. The protector main body 31 includes an insertion opening 31a that opens in a direction intersecting the lengthwise direction of the wire member 20. In other words, the pair of side walls 33 are not continuous with each other at the end portions on the opposite side to the bottom wall 32.

A plurality of restricting protruding portions 34 are provided spaced from each other in the longitudinal direction of the bottom wall 32 at the end portion of the protector main body 31. The restricting protruding portions 34 protrude from the bottom wall 32 and are provided extending to the side walls 33. The restricting protruding portions 34 are U-shaped along the outer circumferential surfaces of a ring-like recessed portions 42, which will be described later, of a first corrugated tube 40, as seen in the lengthwise direction of the wire member 20. The pitch of the restricting protruding portions 34 is the same as the pitch of the ring-like recessed portions 42.

A plurality of lock frame portions 35 are provided spaced apart from each other in the longitudinal direction of the bottom wall 32 on the outer circumferential surfaces of the side walls 33.

The cover 36 includes an opposing wall 37 that opposes the bottom wall 32 of the protector main body 31 and a plurality of lock claw portions 38 that protrude from the opposing wall 37 toward the protector main body 31. The cover 36 is attached to the protector main body 31 so as to cover the entirety of the insertion opening 31a of the protector main body 31.

The lock claw portions 38 are respectively provided at locations corresponding to the lock frame portions 35 of the protector main body 31. The cover 36 is fixed to the protector main body 31 in the state of covering the insertion opening 31a of the protector main body 31 by the lock claw portions 38 being locked in the lock frame portions 35.

Configuration of First Corrugated Tube 40

As shown in FIG. 2, the first corrugated tube 40 is shaped like a tube that surrounds the entirety in the circumferential direction of the outer circumference of the wire member 20. The first corrugated tube 40 has a bellows structure in which ring-like protruding portions 41 and the ring-like recessing portions 42 are alternately arranged side by side in the lengthwise direction of the first corrugated tube 40. The first corrugated tube 40 has a higher flexibility than the core wire 22. The first corrugated tube 40 of the present embodiment is shaped like a cylinder.

A conductive resin material or a non-conductive resin material can be used as the material of the first corrugated tube 40, for example. A synthetic resin such as polyolefin, polyamide, polyester, or ABS resin, for example, can be used as the resin material.

The restricting protruding portions 34 of the protector main body 31 are fitted in the ring-like recessed portions 42 in a portion, of the first corrugated tube 40, that is housed in the protector 30. Accordingly, movement of the first corrugated tube 40 in the lengthwise direction of the wire member 20 is restricted.

Configuration of Second Corrugated Tube 50

The second corrugated tube 50 is provided spaced apart from the first corrugated tube 40 in the lengthwise direction of the wire member 20. The second corrugated tube 50 is shaped like a tube that surrounds the entirety in the circumferential direction of the outer circumference of the wire member 20. The second corrugated tube 50 has a bellows structure in which ring-like protruding portions 51 and ring-like recessed portions 52 are alternately arranged side by side in the lengthwise direction of the second corrugated tube 50. The second corrugated tube 50 has a higher flexibility than the core wire 22. The second corrugated tube 50 of the present embodiment is shaped like a cylinder.

A conductive resin material or a non-conductive resin material can be used as the material of the second corrugated tube 50, for example. A synthetic resin such as polyolefin, polyamide, polyester, ABS resin can be used as the resin material.

Configuration of Exterior Member 60

As a whole, the exterior member 60 is shaped like a tube that extends along the lengthwise direction of the wire member 20. The exterior member 60 surrounds the entirety in the circumferential direction of the outer circumference of the wire member 20. The exterior member 60 is formed by a sheet-like woven fabric or a sheet-like nonwoven fabric. The exterior member 60 is formed by rolling a resin sheet material formed by a woven fabric that contains PET fibers and aramid fibers into a cylindrical tube. The exterior member 60 has a higher flexibility than the first corrugated tube 40 and the second corrugated tube 50.

Figure 3:
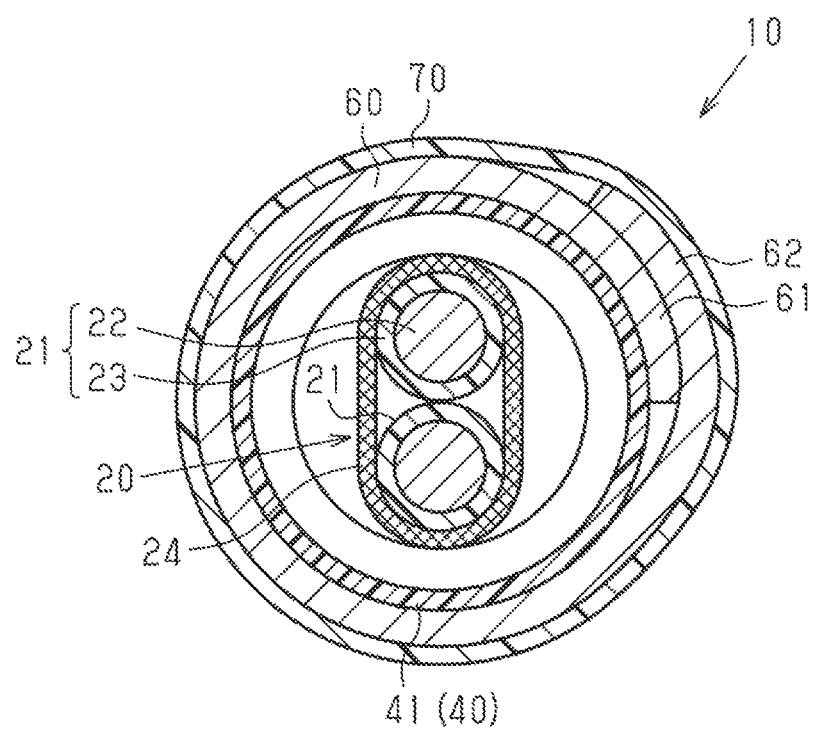
FIG. 3 is a cross-sectional view taken along line 3-3 in FIG. 2.

As shown in FIG. 3, the exterior member 60 has a first end 61 in the circumferential direction that intersects the lengthwise direction of the wire member 60 and a second end 62 located on the opposite side to the first end 61 in the circumferential direction. The exterior member 60 of the present embodiment is shaped like a cylinder by overlapping the first end 61 and the second end 62 with each other in the thickness direction.

Configuration of Tape Member 70

As shown in FIG. 2, the tape member 70 includes an adhesive layer on one side in the thickness direction. The tape member 70 is wound a plurality of times around the first corrugated tube 40, the exterior member 60, and the second corrugated tube 50, with the adhesive layer facing inward. More specifically, the tape member 70 is wound a plurality of times from around an outer circumferential surface of the first corrugated tube 40 to around an outer circumferential surface of the second corrugated tube 50. Accordingly, the entirety of the outer circumferential surface of the exterior member 60 is covered with the tape member 70.

The tape member 70 has an overlapping-winding structure, for example. Here, the overlapping-winding structure is a structure in which the tape member 70 is wound in a spiral manner such that prescribed portions in the width direction of the tape member 70 overlap each other. It is preferable that the overlapping-winding structure is a half-wrapping winding structure, for example. Here, the half-wrapping winding structure is a structure in which the tape member 70 is wound in a spiral manner such that portions that are substantially the half in the width direction of the tape member 70 overlap each other.

As such, the exterior member 60 is fixed to the first corrugated tube 40 and the second corrugated tube 50 with the tape member 70. In this manner, the first corrugated tube 40 and the second corrugated tube 50 are coupled to each other via the exterior member 60. Note that the exterior member 60 is not fixed to the wire member 20.

Now, the operations and effects of the present embodiment will be described.

(1) The wire member 20 includes the intermediate portion 20a located between the first corrugated tube 40 and the second corrugated tube 50 in the lengthwise direction of the wire member 20. The exterior member 60 covers the outer circumference of the intermediate portion 20a and has a higher flexibility than the first corrugated tube 40.

According to this configuration, since the exterior member 60 has a higher flexibility than the first corrugated tube 40, when the wire harness 10 is bent, the external force that acts on the second corrugated tube 50 is not likely to be transmitted to the first corrugated tube 40. In this manner, when the wire harness 10 is bent, the exterior member 60 is likely to bend and the first corrugated tube 40 is not likely to bend. Accordingly, crushing of the first corrugated tube 40 due to being pressed against the edge of the protector 30 can be suppressed.

(2) The exterior member 60 is fixed to the first corrugated tube 40 and the second corrugated tube 50 with the tape member 70.

With this configuration, the tape member 70 suppresses positional displacement of the exterior member 60 with respect to the first corrugated tube 40 and the second corrugated tube 50.

(3) The exterior member 60 overlaps the first corrugated tube 40 and the second corrugated tube 50 in the direction intersecting the lengthwise direction of the wire member 20. The tape member 70 is provided on the outer circumference of the first corrugated tube 40 and the exterior member 60, and on the outer circumference of the second corrugated tube 50 and the exterior member 60.

According to this configuration, since the tape member 70 is not in contact with the outer circumferential surface of the wire member 20, relative movement of the wire member 20 with respect to the first corrugated tube 40, the second corrugated tube 50, and the exterior member 60 is permitted. Accordingly, the assembling workability of the wire harness 10 can be improved.

(4) The tape member 70 is wound from around the outer circumferential surface of first corrugated tube 40 to around the outer circumferential surface of the second corrugated tube 50.

With this configuration, the entirety of the outer circumferential surface of the exterior member 60 is covered with the tape member 70. In this manner, since the exterior member 60 is tightened toward the wire member 20 by the tape member 70, the outer size of the exterior member 60 is decreased compared to the case where the exterior member 60 is not covered with the tape member 70. Accordingly, the wire harness 10 can be decreased in size. Furthermore, since the exterior member 60 is not visible due to being covered with the tape member 70, the appearance of the wire harness 10 can be improved.

(5) The exterior member 60 is formed by rolling the sheet-like resin material into a tubular shape.

With this configuration, the exterior member 60 can be easily attached afterwards. Accordingly, the assembling workability of the wire harness 10 can be improved.

(6) The wire member 20 includes the wires 21, and the braided wire 24 that is formed by braiding the conductive strands into a tubular shape, and covers the outer circumference of the wires 21.

According to this configuration, the braided wire 24 electromagnetically shields the wires 21.

Furthermore, according to the above-described configuration, since the braided wire 24 is provided between the wires 21 and the exterior member 60, relative movement between the wire member 20 with respect to the first corrugated tube 40, the second corrugated tube 50, and the exterior member 60, in particular, relative movement of the wires 21 is likely to be permitted. Accordingly, the assembling workability of the wire harness 10 can be improved.

Modifications

The present embodiment can be modified and implemented as follows. The present embodiment and the following modifications can be combined with each other and implemented as long as no technical inconsistencies arise.

The wire member 20 need not include a braided wire 24.

The exterior member 60 is not limited to being formed of PET fibers and aramid fibers, and may also be formed of PET fibers and amide fibers, for example.

The exterior member 60 may also be formed by a heat-shrinkable tube, or formed by rolling a resin sheet formed of polyvinyl chloride (PVC) or the like, into a tubular shape, for example, as long as the exterior member 60 covers the outer circumference of the intermediate portion 20a.

The exterior member 60 may also be formed into a tubular shape in advance. In this case, the exterior member 60 may be attached by inserting the wire member 20 into the exterior member 60.

The exterior member 60 need not overlap the end portion 40a of the first corrugated tube 40 and the end portion 50a of the second corrugated tube 50 in the direction that intersects the lengthwise direction of the wire member 20. In other words, the exterior member 60 may also cover only the intermediate portion 20a. At this time, the exterior member 60 may also cover the entirety in the lengthwise direction of the intermediate portion 20a, or a portion in the lengthwise direction of the intermediate portion 20a.

In the present embodiment, the tape member 70 was illustrated as the fixing member, but there is no limitation to this, and the fixing member may also be a cable tie, a heat-shrinkable tube, or the like.

In the tape member 70, a portion wound around the outer circumferential surface of the exterior member 60 and the outer circumferential surface of the first corrugated tube 40 may also be separate from a portion wound from around the outer circumferential surface of the exterior member 60 to around the outer circumferential surface of the second corrugated tube 50. In other words, a portion of the exterior member 60 need not be covered with the tape member 70.

The first end 61 and the second end 62 of the exterior member 60 may also be fixed with the tape member 70 in the state of abutting each other.

The second corrugated tube 50 may also have a higher flexibility than the exterior member 60. In this case as well, the above-described operations and effects (1) can be achieved.

The wire member 20 may have one wire 21, or three or more wires 21.

The first corrugated tube 40 and the second corrugated tube 50 may also have a slit that extends along the lengthwise direction of the wires 21, or may also have no slit.

What is claimed is:

1. A wire harness comprising:
a wire member;
a protector that houses the wire member;
a first corrugated tube that externally extends from an end of the protector and covers an outer circumference of the wire member;
a second corrugated tube that is provided at a location that is on an opposite side to the protector with respect to the first corrugated tube and spaced apart from the first corrugated tube, and covers the outer circumference of the wire member;
an intermediate portion of the wire member, the intermediate portion being located between the first corrugated tube and the second corrugated tube in a lengthwise direction of the wire member; and
an exterior cover that covers the outer circumference of the wire member, the exterior cover covering an outer circumference of the intermediate portion of the wire member and having a higher flexibility than the first corrugated tube, and the exterior cover overlapping an end portion of the first corrugated tube and an end portion of the second corrugated tube.

2. The wire harness according to claim 1, further comprising
a fixing member that fixes the exterior cover to the first corrugated tube and the second corrugated tube.
3. The wire harness according to claim 2, wherein:
the exterior cover overlaps the first corrugated tube and the second corrugated tube in a direction intersecting the lengthwise direction of the wire member, and
the fixing member is provided on the outer circumferences of the first corrugated tube and the exterior cover and on the outer circumferences of the second corrugated tube and the exterior cover.
4. The wire harness according to claim 1,
wherein the exterior cover is formed by rolling a resin sheet material into a tubular shape.
5. The wire harness according to claim 1,
wherein the wire member includes:
a wire; and
a braided wire that is formed by braiding conductive strands into a tubular shape and covers the outer circumference of the wire.

* * * * *